United States Patent [19]

Schwenninger et al.

[11] Patent Number: 4,849,004
[45] Date of Patent: Jul. 18, 1989

[54] PULSED PRESSURE METHOD FOR VACUUM REFINING OF GLASSY MATERIALS

[75] Inventors: Ronald L. Schwenninger, Ridgeley, W. Va.; David A. Hanekamp, Cumberland, Md.; Homer R. Foster, Kittanning, Pa.

[73] Assignee: PPG Industries, Inc., Pittsburgh, Pa.

[21] Appl. No.: 264,750

[22] Filed: Oct. 31, 1988

[51] Int. Cl.⁴ .............................................. C03B 5/225
[52] U.S. Cl. .................................... 65/134; 65/32.5; 65/135; 65/136; 65/141
[58] Field of Search ............... 65/32.5, 134, 135, 136, 65/141

[56] References Cited

U.S. PATENT DOCUMENTS

| | | |
|---|---|---|
| 805,139 | 11/1905 | Hitchcock . |
| 1,564,235 | 12/1925 | Harrington . |
| 1,598,308 | 8/1926 | Pike . |
| 2,781,411 | 2/1957 | Geffcken et al. . |
| 2,877,280 | 3/1959 | Eden . |
| 3,338,694 | 8/1967 | Davey ................... 65/32 |
| 3,350,185 | 10/1967 | Rough ................... 65/32 |
| 3,429,684 | 2/1969 | Plumat ................... 65/335 |
| 3,442,622 | 5/1969 | Monnier et al. ........... 23/233.5 |
| 3,519,412 | 7/1970 | Olink ................... 65/337 |
| 4,195,982 | 4/1980 | Coucoulas et al. ........ 65/134 |
| 4,381,934 | 5/1983 | Kunkle et al. ........... 65/135 |
| 4,549,896 | 10/1985 | Streicher et al. ........ 65/135 |
| 4,704,153 | 11/1987 | Schwenninger et al. ..... 65/134 |
| 4,738,938 | 4/1988 | Kunkle et al. ........... 65/135 X |
| 4,794,860 | 1/1989 | Welton ................. 65/135 |

Primary Examiner—Arthur Kellogg
Attorney, Agent, or Firm—Dennis G. Millman

[57] ABSTRACT

In a process for refining molten glass or the like by vacuum, the collapse of foam is accelerated by periodically applying a surge of pressure that disrupts foam stability. Preferably, the surge is a short pulse of lower pressure.

19 Claims, 1 Drawing Sheet

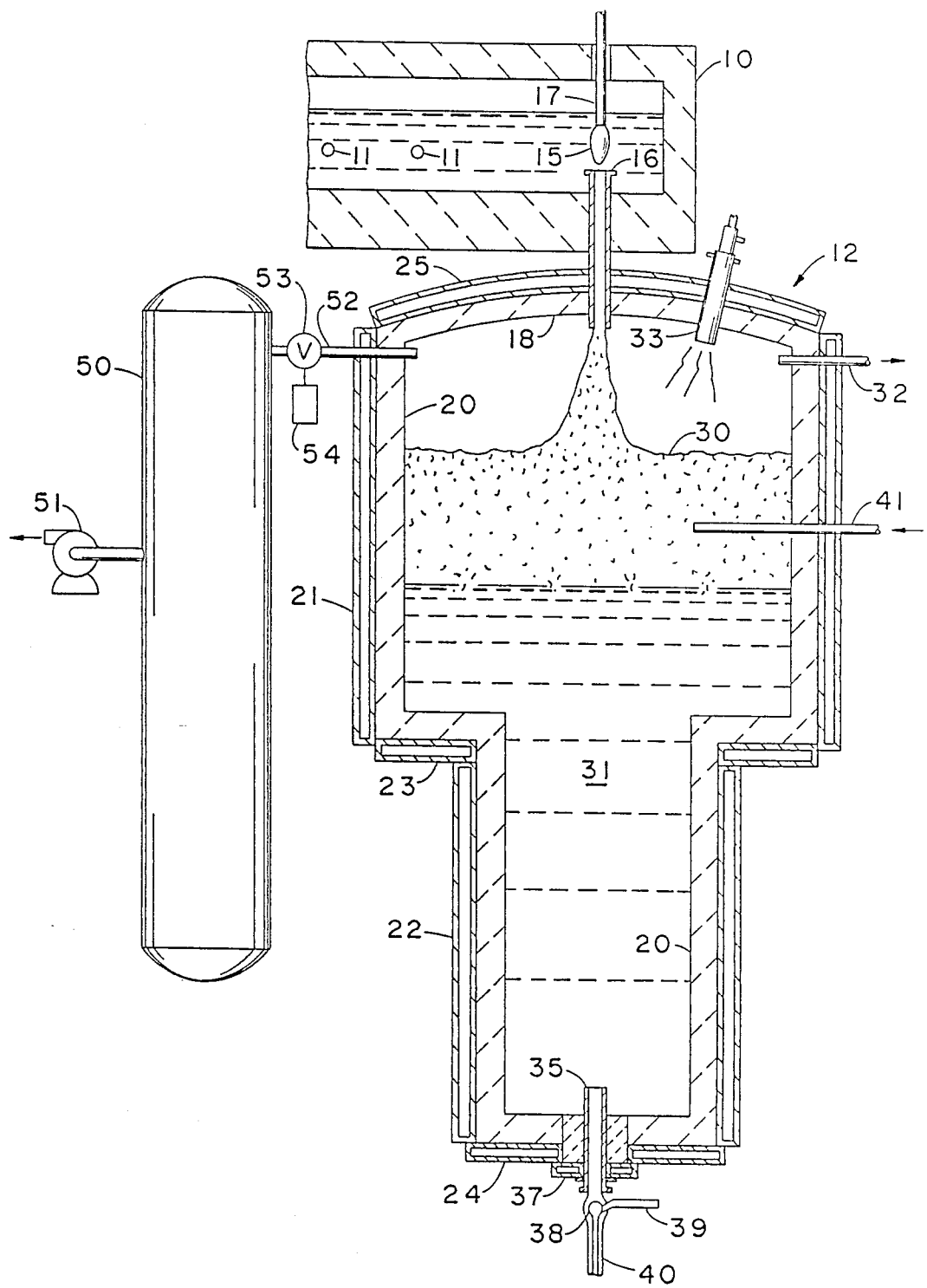

PULSED PRESSURE METHOD FOR VACUUM REFINING OF GLASSY MATERIALS

BACKGROUND OF THE INVENTION

The present invention relates to the use of subatmospheric pressure to expedite refining of molten glass or the like. More particularly, the invention relates to a practical arrangement for controlling the amount of foaming in such a refining technique.

In the melting of glass, substantial quantities of gas are produced as a result of decomposition of batch materials. Other gases are physically entrained by the batch materials or are introduced into the melting glass from combustion heat sources. Most of the gas escapes during the initial phase of melting, but some becomes entrapped in the melt. Some of the trapped gas dissolves in the glass, but other portions form discrete gaseous inclusions known as bubbles or "seeds" which would be objectionable if permitted to remain in unduly high concentrations in the product glass. The gas inclusions will rise to the surface and escape from the melt if given sufficient time in the stage of a melting operation known as "refining" or "fining." High temperatures are conventionally provided in the refining zone to expedite the rise and escape of the gaseous inclusions by reducing the viscosity of the melt and by enlarging the bubble diameters. The energy required for the high temperatures employed in the refining stage and the large melting vessel required to provide sufficient residence time for the gaseous inclusions to escape from the melt are major expenses of a glassmaking operation. Accordingly, it would be desirable to assist the refining process to reduce these costs.

It has been known that reduced pressure could assist the refining process by reducing the partial pressure of the included gaseous species and by increasing the volume of bubbles within the melt so as to speed their rise to the surface. The impracticality of providing a gas-tight vessel on the scale of a conventional refining chamber so as to draw a vacuum therein has limited the use of vacuum refining to relatively small scale batch operations such as disclosed in U.S. Pat. Nos. 1,564,235; 2,781,411; 2,877,280; 3,338,694; and 3,442,622.

Continuous vacuum refining processes have been proposed but have not found acceptance for large scale, continuous manufacture of glass due to various drawbacks. In the continuous vacuum refining arrangements shown in U.S. Pat. Nos. 805,139; 1,598,308; and 3,519,412 a major disadvantage is the requirement for relatively narrow vertical passageways leading into and out of the vacuum zone necessitated by the pressure difference. These passageways complicate the construction of such a vessel, particularly in view of the requirement for gas-tight walls, increase the exposure of the throughput to contaminating refractory contact, and impose a significant viscous drag to the throughput flow. It may be noted that a column of glass of about 4.5 meters is required to balance a vacuum of one atmosphere. Varying the output of such a system is also a problem particularly in view of the viscous drag factor. Variability is important in a continuous commercial operation due to changes in the product being made and economic factors that affect the rate of production desired. In each of the three patents noted above, the driving force for increasing the rate of flow through the passages of the vacuum section can be provided only by increasing the depth of the melt upstream of the vacuum section relative to the depth of the melt downstream from the vacuum section. The magnitude of this level difference is exacerbated by the viscous drag inherent in these systems. Because accelerated erosion of the side walls occurs at the elevation of the surface of the melt, significantly changing the level aggravates the erosion which, in turn, deteriorates the quality of the product glass.

A simpler structure is shown in U.S. Pat. No. 3,429,684, wherein batch materials are fed through a vacuum lock and melted at the top of a vertically elongated vacuum chamber. Varying throughput in that arrangement appears to require changing the amount of vacuum imposed in the chamber, which would disadvantageously alter the degree of refining achieved. Melting raw materials within the vacuum chamber is another disadvantage of that arrangement for three reasons. First, large volumes of foam would be created by carrying out the initial decomposition of the raw materials under vacuum, which would require a vessel large enough to contain the foam. Second, there is a danger that raw materials may follow a short circulation path to the output stream, thus avoiding adequate melting and refining. Third, carrying out the initial stages of melting and heating the melt to a refining temperature within the vacuum vessel require large amounts of heat to be supplied to the melt within the vessel. Such a major heat input to the vessel inherently induces convection currents within the melt that increase erosion of the walls, which leads to contamination of the refined product stream.

U.S. Pat. No. 4,195,982 discloses initially melting glass under elevated pressure and then refining the glass in a separate chamber at a lower pressure. Both chambers are heated.

A preferred technique for vacuum refining glass is disclosed in U.S. Pat. No. 4,738,938 (Kunkle et al.) wherein the creation of foam is deliberately enhanced by introducing the molten glass into the vacuum chamber above the level of the molten glass held therein. Excessive foam may be a problem encountered with vacuum refining of any type, but is particularly a problem in the method of U.S. Pat. No. 4,738,938 where a copious volume of foam is sometimes produced, particularly at lower pressures. A large space above the liquid container must be provided to accommodate the foam if a large throughput is desired. Since this headspace must also be maintained gas-tight, its construction can be a significant economic drawback, particularly on a large scale process. As a result, the volume of foam acts as a limiting factor to the throughput rate and/or the degree of vacuum that can be utilized. It would be desirable to alleviate this constraint on vacuum refining processes.

Some techniques for reducing the volume of foam in a vacuum refining process are disclosed in U.S. Pat. No. 4,704,153 (Schwenninger et al.) and U.S. patent application Ser. No. 102,227 filed on Sept. 29, 1987 now U.S. Pat. No. 4,794,860. The former employs a burner in the headspace and the latter injects foam-breaking substances such as water into the foam. Although these techniques are effective, it would be desirable to provide further freedom from the limitation of foam volume in order to provide further operating versatility.

U.S. Pat. No. 3,350,185 discloses a technique for collapsing foam in a glass melting process at atmospheric pressure, wherein an abrupt change in the oxidizing or reducing condition of the combustion was found to cause foam to collapse.

SUMMARY OF THE INVENTION

In the present invention, the volume of foam accumulating in a vacuum refining chamber is controlled by suddenly changing the pressure so as to disrupt the bubble membranes of the foam, thereby bursting a substantial portion of the bubbles and expediting collapse of the foam. A sudden increase in pressure will cause contraction of the bubbles, which may cause some bursting. Returning to the original vacuum level quickly may cause further disruption to the stability of the foam. In the preferred embodiment, a sudden surge of lower pressure is employed, whereby a substantial portion of the foam bubbles are expanded beyond their limit of elasticity and break. The pressure surges may be applied at intervals of several minutes and their duration may be on the order of a few seconds.

The method of the present invention has advantages over other foam-breaking techniques in that it does not involve adding any substance that would alter the glass composition or cool the glass in the refining vessel. Alternatively, the foam-breaking technique of the present invention may be practiced in conjunction with other techniques to yield an additive effect.

THE DRAWING

The FIGURE is a vertical cross-section through a vacuum refining vessel with pressure pulsing means in accordance with a preferred embodiment of the present invention.

DETAILED DESCRIPTION

The detailed description will be set forth in conjunction with a method and apparatus specifically adapted for melting glass and similar glassy materials, but it should be understood that the invention is applicable to the processing of other materials as well.

Although not limited thereto, the present invention is advantageously used in conjunction with a vacuum refining system disclosed in U.S. Pat. No. 4,738,938. In that application an arrangement is disclosed whereby vacuum refining may be employed in a commercial scale, continuous glass melting process in a manner that advantageously and economically overcomes the drawbacks of the prior art. Molten glass is admitted to the vacuum refining chamber only after the majority of the thermal energy required for melting has been imparted to the melt so that little or no thermal energy need be supplied to the molten material contained within the vacuum chamber. Any known arrangement may be used to melt the glass prior to the refining step, but in preferred embodiments, batch materials are first liquified at a stage specifically adapted for that step of the process such shown in U.S. Pat. No. 4,381,934, and the liquefied material is transferred to a second stage 10, a portion of which is shown in the FIGURE, where dissolution of solid particles is essentially completed and the temperature of the material may be raised to a temperature suitable for refining. Subsequently, the molten material is passed to the vacuum chamber 12. In that arrangement, a large portion of the gaseous by-products of melting are driven off before the material is subjected to vacuum, and the region of greatest gas evolution is separated from the refining zone, whereby materials undergoing the early stages of melting cannot become mixed with portions of the melt undergoing refining. Because most or all of the thermal requirement for melting has been satisfied before the material enters the vacuum refining stage, and heating of the refining stage can therefore be substantially avoided, excessive convection of the melt in the refining zone can be avoided. As a result, vessel erosion is reduced, and the probability of incompletely refined portions of the melt becoming mixed with more refined portions is reduced.

It is preferred to heat the material in the final stage of the melting process (e.g., vessel 10) so as to raise its temperature in preparation for the refining stage to follow. Maximizing the temperature for refining is advantageous for the sake of reducing glass viscosity and increasing vapor pressure of included gases. Typically a temperature of about 2800° F. (1520° C.) is considered desirable for refining soda-lime-silica glass, but when vacuum is employed to assist refining, lower peak refining temperatures may be used without sacrificing product quality. The amount by which temperatures can be reduced depends upon the degree of vacuum. Therefore, when refining is to be performed under vacuum in accordance with the present invention, the glass temperature need be raised to no more than 2700° F. (1480° C.), for example, preferably no more than 2600° F. (1430° C.), and optimally no more than 2500° F. (1370° C.) prior to refining. Peak temperature reduction on this order result in significantly longer life for refractory vessels as well as energy savings. Combustion heat sources could be used in the vessel 10, but it has been found that this stage lends itself well to electric heating, whereby a plurality of electrodes 11 may be provided as shown in the FIGURE extending horizontally through the sidewalls. Heat is generated by the resistance of the melt itself to electric current passing between electrodes in the technique conventionally employed to electrically melt glass. The electrodes 11 may be carbon or molybdenum of a type well known to those of skill in the art.

A valve controlling the flow of material from the melting vessel 10 to the refining stage 12 is comprised of a plunger 15 axially aligned with a drain tube 16. The shaft 17 of the plunger extends through the roof of the vessel 10 so as to permit control over the gap between the plunger 15 and the tube 16 to thereby modulate the rate of flow of material into the refining stage. The valve tube 16 may be fabricated of a refractory metal such as platinum and is fitted into an orifice at the upper end of the refining vessel, preferably in the roof 18 of the refiner, but a side wall location may also be feasible.

The refining stage 12 preferably consists of a vertically upright vessel that may be generally cylindrical in configuration, preferably with an enlarged upper portion to provide additional volume to contain the foam, and having an interior ceramic refractory lining 20 shrouded in a gas-tight water-cooled casing. The casing may include a double walled, cylindrical sidewall members 21 and 22 having annular water passageways, and circular end coolers 23 and 24. The roof 18 may be slightly domed for structural integrity and may also be provided with a fitted cooler 25. Any suitable cooling arrangement may be employed. A layer of insulation (not shown) may be provided between the lining 20 and the cooling jackets.

As the molten material passes through the tube 16 and encounters the reduced pressure within the refining vessel, gases included in the melt expand in volume, creating a foam layer 30 resting on a body of liquid 31. As foam collapses it is incorporated into the liquid body 31. Subatmospheric pressure may be established within the refining vessel through a primary vacuum conduit 32 extending through the upper portion of the vessel. Optionally, a burner 33 may be provided to heat the upper portion of the vessel interior. Introducing the melt at or near the top of the vacuum vessel is preferred because it places the incoming, actively foaming material having the greatest gas content above the other material in the vessel, where the thin foam membranes are exposed to the lowest pressure and the gases escaping from bursting bubbles are most free to escape into the headspace.

Refined molten material is drained from the bottom of the refining vessel 12 by way of a drain tube 35 of a refractory metal such as platinum. The drain tube 35 preferably extends above the surface of the refractory bottom within which it is mounted to prevent any debris from entering the output stream. Leakage around the tube may be prevented by a water cooler 37 affixed to the bottom cooling jacket 24. The flow rate of molten material from the drain tube 35 may be controlled by a conical throttle member 38 carried at the end of a stem 39. The stem 39 is associated with mechanical means (not shown) to adjust the elevation of the throttle member 38 and thus adjust the gas between the throttle member and the tube 35 so as to control the flow rate therefrom. A molten stream 40 of refined material falls freely from the bottom of the refining vessel and may be passed to a forming station (not shown) where it may be shaped to the desired product. Refined glass, for example, may be passed to a float glass forming chamber where the molten glass floats on a pool of molten metal to form a flat sheet of glass.

The height of molten material 31 retained in the refiner 12 is dictated by the level of vacuum imposed in the chamber. The pressure head due to the height of the liquid must be sufficient to establish a pressure equal to or greater than atmospheric at the outlet to permit the material to drain freely from the vessel. The height will depend upon the specific gravity of the molten material, which for soda-lime-silica glass at the temperatures involved is about 2.3. A height in excess of the minimum required to offset the vacuum may be desired to account for fluctuations in atmospheric pressure, to permit variation of the vacuum, and to assure steady flow through the outlet. In the preferred embodiments of the present invention, a substantial excess height is provided so that the outlet flow rate is not determined by the vacuum pressure, but rather by mechanical valve means. Such an arrangement permits the throughput rate and the vacuum pressure to be varied independently of each other. Alternatively, the pressure at the outlet could be below atmospheric if the outlet is provided with pump means to overcome the pressure differential. An example of a pump that is intended for use with molten glass is disclosed in U.S. Pat. No. 4,083,711.

The benefits of vacuum on the refining process are attained by degrees; the lower the pressure, the greater the benefit. Small reductions in pressure below atmospheric may yield measurable improvements, but to economically justify the vacuum chamber the use of substantially reduced pressures are preferred. Thus, a pressure of no more than one-half atmosphere is preferred for the appreciable refining improvements imparted to soda-lime-silica flat glass. Even better results are obtained at one-third atmosphere or less. Absolute pressures less than 100 torr (e.g. 20–50 torr) are preferred in order to yield commercial float glass quality of about one seed per 1,000 to 10,000 cubic centimeters. Seeds less than 0.01 millimeter in diameter are considered imperceptible and are not included in the seed counts.

If it is desired to use the foam-breaking method of the present invention in conjunction with the techniques disclosed in U.S. patent application Ser. No. 102,227 filed Sep. 29, 1987, by W. M. Welton, as is preferred, a conduit may extend into the vacuum vessel for introducing foam-breaking agents such as water into contact with the foam. In the drawing, there is shown an arrangement for injecting the water or other foam-breaking liquid into the refining vessel 12 wherein a tube 41 carrying the liquid terminates within the foam layer 30. The tube 41 may extend into the foam from above or may extend substantially horizontally from an opening in the side wall of the vessel 12 at an appropriate elevation as shown in the FIGURE. The tube 41 may be provided with a water-cooled jacket to enhance its preservation. The pressure difference between the interior and exterior of the vessel will draw the liquid into the vessel.

In the embodiment depicted in the FIGURE, the improvement of the present invention involves an auxiliary vacuum tank 50 which is maintained under vacuum by means of a pump 51. The tank 50 may be connected to the interior head space of the refining vessel 12 by means of a conduit 52 or by means of the primary vacuum conduit 32. A valve 53 is provided to intermittently put the tank 50 in communication with the refining vessel interior. A controller 54 may be provided to automatically open the valve 53 at timed intervals or in response to predetermined process conditions.

To effect a sudden increase in pressure, the refiner may simply be opened momentarily to atmospheric pressure. For a sudden decrease in pressure a vacuum reservoir such as tank 50 is expedient. A pressure is provided in tank 50 that is substantially lower than that in the refiner, and when valve 53 is opened an intermediate pressure is quickly attained in both the tank and the refiner. The intermediate pressure depends upon the initial pressures in the tank and refiner and the volume of the tank relative to that of the refiner head space. A large tank volume has the advantage of permitting the use of a relatively small vacuum pump. Due to the fact that the interval between surges is generally much larger than the duration of the surge itself, sufficient time is available for a relatively small pump to draw a low pressure in a large tank when valve 53 is closed between surges. The duration of the vacuum surge itself is preferably minimized to prevent an overall increase in the volume of the foam layer 30. The frequency of surges is likewise minimized. If pulses of higher pressure are used, their frequency and duration are preferably minimized because each pulse momentarily interrupts the effectiveness of the vacuum refining. The duration of a vacuum pulse would normally be no more than a few seconds, depending upon the time required for the pressure in the tank 50 to propagate throughout the head space of the refining vessel 12. It is contemplated that a duration longer than ten seconds would seldom be required, and a duration on the order of one second or less is preferred. The frequency of pulses depends upon if the foam layer is growing and whether or not other foam control means are being employed. In general, a cycle of ten seconds may be considered relatively rapid, and a cycle of one minute or more may be considered more typical and preferable. In any case, the pulse duration constitutes a minor portion of the cycle, preferably no more than ten percent of the cycle.

For the pressure surge to have a significant foam-breaking effect, the change in pressure should be substantial, i.e., at least ten percent higher or lower than the normal operating pressure in the refiner headspace. A pressure change of fifty percent or more is preferred. Maximizing the pressure change is preferred for the sake of the greatest disruption of the foam, but must be balanced against the greater equipment and operating costs for providing substantially lower pressure. It should also be apparent that in an arrangement such as that shown in the FIGURE, the pressure in the tank 50 prior to opening the valve 53 must be substantially lower than the lowest pressure intended to be attained in the refiner headspace during the pressure pulse. By way of example, when operating with a normal refiner headspace pressure of 40 torr, a pulse pressure of 20 torr may be desirable, in which case tank 50 might be at 10 torr immediately prior to a pulse.

Other variations as would be known to those of skill in the art may be resorted to within the scope of the present invention as defined by the claims that follow.

We claim:

1. A method of refining glassy materials or the like wherein a volume of the material in a molten state is retained in a vessel, subatmospheric pressure is maintained in the vessel above the molten material so as to assist refining of the material, whereby foam is present above the material in the vessel, characterized by periodically applying a rapid, temporary pressure change in the vessel above the molten material so as to accelerate collapse of the foam.

2. The method of claim 1 wherein the pressure change includes an increase in pressure.

3. The method of claim 1 wherein the pressure change includes a decrease in pressure.

4. The method of claim 1 wherein the difference in pressure attained during the pressure change is at least ten percent of the original pressure.

5. The method of claim 1 wherein the difference in pressure attained during the pressure change is at least fifty percent of the original pressure.

6. The method of claim 1 wherein the changed pressure is maintained in the vessel a minority of the time.

7. The method of claim 5 wherein the changed pressure is maintained in the vessel no more that ten percent of the time.

8. The method of claim 5 wherein the pressure change is applied as a series of pulses.

9. The method of claim 7 wherein the pulses are applied in a cycle having a period of at least ten seconds.

10. The method of claim 7 wherein the pulses are applied in a cycle having a period of at least one minute.

11. The method of claim 7 wherein the pulses have a duration of no more than ten seconds.

12. The method of claim 7 wherein the pulses have a duration of no more than one second.

13. The method of claim 1 wherein the pressure in the vessel is no more than one-half of atmospheric pressure.

14. The method of claim 1 wherein the pressure is no more than 100 torr.

15. The method of claim 1 wherein the material being refined is soda-lime-silica glass.

16. The method of claim 1 wherein a foam collapsing substance is fed into the vessel into contact with the foam.

17. The method of claim 15 wherein the foam collapsing substance is fed intermittently into the foam.

18. The method of claim 1 wherein the material is liquefied prior to entering the vessel.

19. The method of claim 16 wherein the foam collapsing substance includes water.

* * * * *